United States Patent [19]

Norton et al.

[11] 3,779,917

[45] Dec. 18, 1973

[54] OIL RECOVERY WITH VINYL SULFONIC ACID-ACRYLAMIDE COPOLYMERS

[75] Inventors: Charles J. Norton; David O. Falk, both of Denver, Colo.

[73] Assignee: Marathon Oil Company, Findlay, Ohio

[22] Filed: Nov. 26, 1971

[21] Appl. No.: 209,479

[52] U.S. Cl............ 252/8.55 D, 166/274, 166/275, 260/79.3 M
[51] Int. Cl............................................. E21b 43/20
[58] Field of Search................ 252/8.55 D; 166/273, 166/274, 275; 260/79.3 M, 79.3 MU

[56] References Cited
UNITED STATES PATENTS

| | | | |
|---|---|---|---|
| 3,085,063 | 4/1963 | Turbak | 252/8.55 |
| 3,679,000 | 7/1972 | Kaufman | 252/8.55 |
| 3,336,269 | 8/1967 | Monagle et al. | 260/79.3 |
| 3,002,960 | 10/1961 | Kolodny | 252/8.55 X |
| 2,761,834 | 9/1956 | Suen et al. | 252/8.5 X |

OTHER PUBLICATIONS

Breslow et al., Article in Journal of Polymer Science, Vol. 27, 1958, pages 295–310

*Primary Examiner*—Herbert B. Guynn
*Attorney*—Joseph C. Herring et al.

[57] ABSTRACT

Copolymers of alkali metal vinyl sulfonates and their alkyl derivatives with acrylamides which copolymers have high molecular weights can be formed and partially hydrolyzed to provide mobility control agents for secondary recovery of petroleum. Optionally, these copolymers can be treated with formaldehyde to effect methylolation and can additionally be treated with inorganic sulfites to effect sulfitation. Preferably, prior to use in oil recovery, the copolymers are partially hydrolyzed.

10 Claims, 1 Drawing Figure

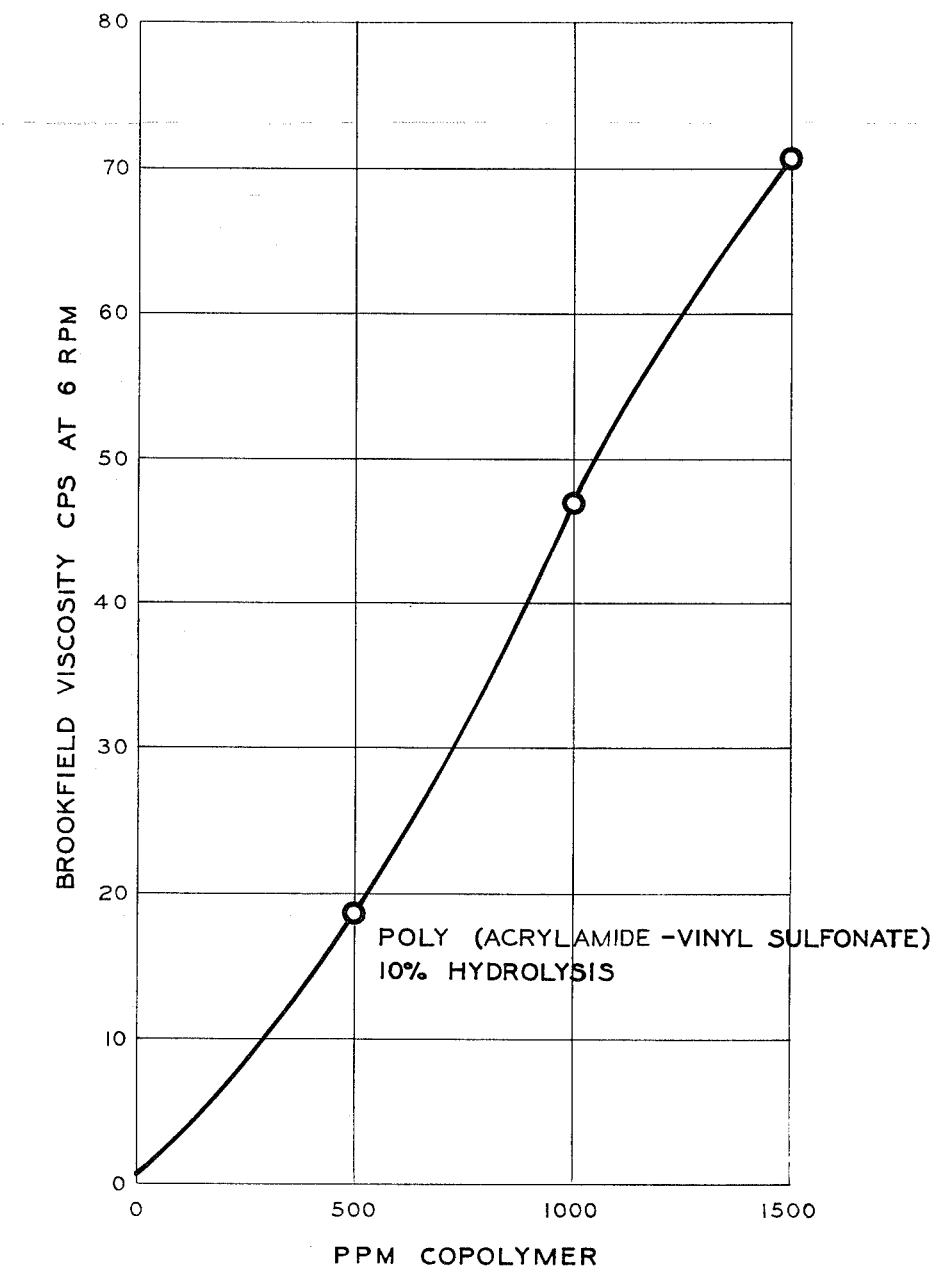

OIL RECOVERY WITH VINYL SULFONIC ACID-ACRYLAMIDE COPOLYMERS

BACKGROUND OF THE INVENTION

1. Field of the Invention

The present invention relates to the injection into formations of fluids comprising water classified in Class166, subclasses -275 and -305 of United States Patent Classification System. 2. Description of the Prior Art A search for pertinent prior art has disclosed the following: U.S. Pat. No. 3,002,960 teaches the discovery of a novel catalyst system for producing a high molecular weight (in excess of 12 million) polyacrylamide which allows for an economically feasible method of flooding oil from subterranean formations. The catalyst systems are of the oxidation-reduction, or so-called redox type, using water soluble tertiary amines and water soluble persulfates; U.S. Pat. No. 2,761,834 teaches the synthesis of anionic polymers prepared from acrylamide, formaldehyde, and a sulfurous acid compound. The principal use of these polymers is in the field of soil conditioners; U.S. Pat. No. 2,761,856 teaches the synthesis of the copolymers of sulfonated methylol acrylamide. These copolymers find application, including the ability to act as an antistatic agent for fibers and fabrics and as surface active agents; U.S. Pat. No. 3,199,588 teaches the synthesis of a class of copolymers used to plug fissures in secondary oil recovery. The plug is a catalyzed resin-forming material consisting of monomeric alkylidene bisacrylamide and another ethylenic monomer copolymerizable; U.S. Pat. No. 3,405,003 teaches the composition comprised of a sulfonate polyacrylamide copolymer salt and an imidazoline plasticizer as applied to the textile soil retardent field; U.S. Pat. No. 3,297,569 teaches the use of a "complex amine sulfonate" to prevent sticking of drill pipe to the well wall and to free drill pipe which has already adhered to the well wall; U.S. Pat. No. 3,247,102 teaches an improved process for the elutriation of digested sludge using a polymeric flocculant (which can be the ammonium salt of vinyl aromatic sulfonic acid). There are numerous other flocculating agents which may be used for this process also; U.S. Pat. No. 3,232,881 teaches a process of removing cured amide polymer resins from substrates. One product of the removal process is an unnamed surface active agent, and no reference is given as to its particular application; U.S. Pat. No. 3,212,577 teaches a process by which a decrease in permeability of a permeable well area can be effected by introducing a resin forming material. The resin is produced by way of a catalytic oxidation reduction system, and it is important that the specific gravity of this resin be greater than1.18; Chemical Abstracts, Vol. 56, page 1234f teaches the degree of aggregation of clay suspensions using poly-vinyl sulfonic acid. The clay aggregation is possible only at very low concentrations.

Copolymers of acrylamide with alkali metal vinyl sulfonesand their derivatives have been discussed in: Kogyo Kagaku Zasshi, 69 (No. 6), 1204-7 (1966) and No. 7, 1339-43 (1966); J. Polymer Science, 27 295-312 (1958); and J. Am. Chem. Soc., 76, 6399 (1954); Ind, & Eng. Chem. 48, No. 12, 2132-37 (1956).

All of the above references which teach copolymers for acrylamide/alkali metal vinyl sulfone or derivatives, teach the production of low molecular weight copolymer in contrast to the high molecular weight copolymers of the present invention. To the best of our knowledge, no one has previously discovered the advantages possible by injecting high molecular weight acrylamide-alkali metal vinyl sulfone or derivatives copolymers into formations in the recovery of petroleum.

SUMMARY OF THE INVENTION

General Statement of the Invention

Enhancing polyionic character of mobility control agents used in recovery of petroleum generally provides enhanced recovery. Achieving this enhancement of polyionic character through use of sulfonate groups provides a mobility control agent with good ability to sustain viscosity in the presence of brine and lime, usually present in the connate waters of petroleum-bearing formations. The present invention accomplishes the addition of sulfonate groups by copolymerizing vinyl sulfones with acrylamide to provide mobility control agents of enhanced efficiency. Further, in preferred embodiments, these copolymers can be methylolated by treatment with formaldehyde. In still more embodiments, the recovery of petroleum can be substantially enhanced by sulfomethylating such copolymers by treatment with formaldehyde and then with sulfites. Such sulfomethylated alkali metal vinyl sulfonate or derivatives-acrylamide copolymers provide a high level of sulfonate groups per molecule with the attendant enhanced ionic character and petroleum recovery efficiency.

Utility of the Invention

The present invention, by increasing the viscosity, and oil recovery efficiency, provides substantially improved efficiencies and economies when used as, or in connection with, displacement fluids for the recovery of petroleum from subterranean formations. In addition, the compositions and processes of the present invention can be utilized for the formulation of controlled density fluids, e.g., for ore flotation, liquid-solid separation processes.

BRIEF DESCRIPTION OF THE DRAWING

The FIGURE is a plot of Brookfield viscosity (centipoises at six revolutions per minute) for several concentrations of the copolymer formed in Example XVI.

DESCRIPTION OF THE PREFERRED EMBODIMENTS

Starting Materials: Unhydrolyzed Poly(acrylamide-vinyl sulfonate).

The acrylamide utilized with the present invention can be acrylamide monomer or of commercial quality, e.g., that produced by Dow Chemical Company, by American Cyanamid Company, (described in their bulletin "Chemistry of Acrylamide"),or others.

The vinyl sulfonate is preferably the sodium salt and is employed as an aqueous solution of about 25 percent.

The copolymer molecular weight should preferably be in the range of from about 1 to about 100, more preferably from 2 to about 50, and most preferably from about 3 to about 12 million.

For the purposes of the present invention, the injected aqueous solution should contain from about 50 to about 5,000, more preferably from about 100 to about 2,000, and most preferably from about 200 to about 1500 parts per million by weight of unhydrolyzed poly(acrylamide-vinly sulfonate). High-shear mixing should be avoided as it may cause rupture of the molecule reducing effective molecular weight and viscosity increasing properties.

Water: Water will preferably be fresh water but can be brackish or slightly saline, e.g., as in connate water. In some situations, there may be some advantages in partial treatment of the water to remove deleterious impurities.

Formaldehyde: The formaldehyde can be in the form of a liquid solution (formalin) preferably containing from about 37 percent by weight formaldehyde which is normal commercially available strength. The percent by weight of formaldehyde in the solution is not narrowly critical and can be adjusted to give the desired incorporation into the product, methylolated poly(acrylamide-vinyl sulfonate). The formaldehyde can be in a gaseous form and bubbled directly into the aqueous solution of unhydrolyzed poly(acrylamide-vinyl sulfonate). Also, paraformaldehyde can be employed either by heating to form gaseous formaldehyde or by dissolving directly into the aqueous solution of unhydrolyzed poly(acrylamide-vinyl sulfonate). Preferably from about 0.01 to about 10.0, more pre-ferably from about 0.1 to about 5, and most preferably from about 0.5 to about 2 moles of formaldehyde per mole of acrylamide monomer unit in the poly(acrylamide-vinyl sulfonate) will be used in the invention.

Sulfites: The sulfites for use with the present invention will be inorganic sulfites, including ammonium sulfite which acts as an inorganic sulfite. "Sulfites" also includes bisulfites and metabisulfites. Sodium sulfite or bisulfite is a preferred source of sulfite ion. However, any non-interfering compound which forms bisulfite or sulfite ions in the reaction mixture may be utilized. By "non-interfering bisulfites" is meant those bisulfite-forming compounds which do not cause undesirable side reactions including among others: alkali sulfites, alkaline earth sulfites, alkali bisulfites, alkaline earth bisulfites, ammonium sulfite, ammonium bisulfite, the corresponding pyrosulfites and metabisulfites. Preferably from about 0.01 to about 2.0, more preferably from about 0.05 to about 1, most preferably from about 0.1 to about 0.5 mole of sulfite per mole of acrylamide monomer unit in the poly(acrylamide-vinyl sulfonate) will be used in the invention.

pH Control in formaldehyde treatment step: It has been discovered that the reaction is greatly enhanced by being conducted at a pH within the range of from about 7.5 to about 11, more preferably from 8.0 to about 10.5, and most preferably from 10 to about 10.5. The pH range can be readily achieved by the use of buffers, e.g., trisodium phosphate, triethanolamine, sodium bicarbonate-carbonate, boric acid-borate, and borax.

pH control is sulfite treatment step: It has been discovered that the reaction with sulfite is most desirably conducted at a pH within the range of from about 9 to about 14, more preferably from about 9.5 to about 13.5, and most preferably from about 10 to about 13. The pH range can readily be achieved by the use of buffers, e.g., trisodium phosphate, sodium polyphosphate, triethanolamine, sodium bicarbonate-sodium carbonate, boric acid-borate, and borax. Addition of the sulfite will itself increase the pH to within the preferred range, i.e., to approximately 12. But the addition of buffer is desirable to assist in maintaining the pH during the sulfite reaction. Temperature in both steps: While not narrowly critical, the reaction between the formaldehyde and the unhydrolyzed poly(acrylamide-vinyl sulfonate) will preferably be conducted in the range of from about 0° to about 300°C., more preferably from about about 20° to about 200°. and most preferably from about 30° to about 100°C. The most optimal temperature for the formaldehyde addition has been found to be approximately 50°C. The contacting of the unhydrolyzed poly(acrylamide-vinyl sulfonate) with the sulfite will preferably occur at about 0° to about 300°C., more preferably 20° to 200°C., and most preferably 30° to 100°C. The most optimal temperature for the sulfite addition has been found to be about 75°C. However, as stated above, the sulfite treatment can be conducted simultaneously with the formaldehyde treatment. Pressure: Pressure in both steps may vary widely, but will, in most cases, be conveniently near atmospheric pressure. However, where higher temperatures are to be used, additional pressure may be imposed above the reaction mixture, e.g., or by the use of inert gases or by the use of compressed air in order to prevent boiling or excessive evaporation of water.

Time: Reaction time for each step (or for the combined step where formaldehyde and sulfite treatments are carried on simultaneously) is also not narrowly critical and may be in the range of from about 0.1 to about 100 hours, more preferably from about 0.5 to about 50 hours, and most preferably from about 1 to about 10 hours.

Batch or Continuous Basis: While the examples below describe the invention on a batch basis, it may, of course, be practiced on a continuous basis with continuous flows of starting materials into the reactor.

Partial Hydrolysis: An important feature of the present invention is that the residual unhydrolyzed acrylamide units in the methylolated copolymer are partially hydrolyzed during the treatment with sulfite. While the degree of hydrolysis is not precisely determined by available analytical techniques, it is estimated to be within the range of from about 5 to 70 percent hydrolysis of the amide groups which have not been reacted with the sulfite. This partial hydrolysis greatly increases the polarity of the molecule in the finished product, and the sulfomethylation further increases this polarity. The resultant molecule polar groups on the polymer tend to strongly repel each other, providing excellent dispersibility and major increase in viscosity and screen factor even in relatively dilute solutions. It is particularly important that these sulfomethylated products of the present invention maintain their high viscosity and screen factor even in the presence of calcium ions. Calcium ions are often encountered in the subterranean formations which contain oil and are known to be deleterious to conventional viscosity and screen factor-increasingagents including unmodified partially hydrolyzed high molecular weight polyacrylamides.

Examples

Examples I – XII

Copolymerization

Monomer concentrations of 0.3 to 0.4 mole/litter acrylamide and 0.02 to 0.07 mole/liter sodium vinyl sulfonate are used. (14.2160g acrylamide and 1.0707g or 4.2828g 25 percent solution of sodium vinyl sulfonate in 500 ml deionized water).

The reaction chamber is purged with nitrogen for at least 30 minutes to remove oxygen.

The reaction mixture is thermostatted at a particular temperature, and the initiator is added. $5.26 \times 10^{-4}$ moles/liter ammonium persulfate is used in Examples I through V, and $0.438 \times 10^{-4}$ moles/liter ammonium persulfate, $2.68 \times 10^{-4}$ moles/liter triethanolamine is used in Examples VI through XII.

Example XIII

Methylolation 100 ml of polymerization reaction solution is diluted to 500 ml with denionized water, or to a workable viscosity (3.0g/500 ml deionized water).

The pH is adjusted to 10.0 to 10.5 with trisodium phosphate, or to pH-8.0 with triethanolamine at 45–50°C.

3.5 to 7.0 cc 37 percent formalin solution is added (0.0863 to 0.1726 mole/liter) and reacted for 1 to 10 hours.

Example XIV

Sulfitation 2.6594 to 5.3188g sodium (0.0422 to 0.0844 mole/liter) is added to the methylolation reaction solution and reacted for 1 to 24 hours at 45 to 50°C. at pH-12 to 13.

The temperature is adjusted to 75°C. for 3 to 24 hours at pH-12 to 13 to effect polymer hydrolysis.

Example XV

Sulfomethylation 100 ml of polymerization reaction solution is diluted to 500 ml with deionized water, or to a workable viscosity. (3.0g/500 ml deionized water).

The pH is adjusted to 10.0 to 10.5 with trisodium phosphate, or to pH-8.0 with triethanolamine.

3.5 to 7.0 cc of 37 percent formalin solution (0.0836 to 0.1726 mole/liter) and 2.6594 to 5.3188g sodium sulfite (0.0422 to 0.0844 mole/liter) is added and reacted for 1 to 24 hours at pH-12 to 13 at 45 to 50°C.

The temperature is adjusted to 75°C. for 5 to 24 hours at pH-12 to 13 to effect polymer hydrolysis.

Example XVI

Hydrolysis of Copolymer 2.5g of the copolymer is dissolved in 250 ml deionized water.

0.1300g sodium hydroxide (1.62 ml of 2N sodium hydroxide is added to the solution and the temperature is adjusted to 90°C. and reacted for 8 hours, then brought to a boil for 15 minutes.

The pH was adjusted to 2 and the copolymer was precipitated with methanol. The copolymer was dried in a vacuum for 24 hours and was redissolved at various concentrations

Example XVII

Core Flood

A Berea core (3 inches × 4 feet) is saturated with water to determine pore volume, saturated with oil, then waterflooded to residual oil saturation.

500 ppm copolymer is used to push a 0.03 PV slug, to produce 30.5 percent additional oil residual recovery.

When the copolymer of Example XVI is treated with 0.00325 mole of NaOH for a contact time of 8 hours, then precipitated with methaol, the resulting hydrolyzed copolymer of acrylamide vinyl sulfonate has a concentration vs. for viscosity curve as shown in FIG. 1.

TABLE 1.—TRIETHANOLAMINE-AMMONIUM PERSULFATE INITIATOR GIVES HIGHER MOLECULAR WEIGHT COPOLYMERS

| Example | Run No. | Mole ratio | Temp., °C. | Reaction time, hr. | Mol. wt. × 10⁻⁶ | Moles/liter A [4] | Moles/liter SVS [5] |
|---|---|---|---|---|---|---|---|
| Ammonium Persulfate [1] | | | | | | | |
| I | B56684 | 1:3 | 40 | 7.5 | none | 0.033 | 0.100 |
| II | B56695 | 1:2 | 40 | 3.2 | none | .100 | .200 |
| III | B56689 | 1:1 | 40 | 4.0 | 0.15 | .167 | .167 |
| IV | B56686 | 3:1 | 40 | 3.5 | .52 | .200 | .067 |
| V | B39026 | 20:1 | 38–23 | 20.0 | 3.41 | .400 | .020 |
| Triethanolamine-Ammonium Persulfate [2] | | | | | | | |
| VI | B39014 | 1:2 | 25 | 25.0 | none | 0.100 | 0.200 |
| VII | B39009 | 1:1 | 25 | 17.0 | 0.55 | .167 | .167 |
| VIII | B56698 [3] | 3:1 | 25 | 16.0 | .82 | .100 | .033 |
| IX | B39015 | 20:1 | 23 | 20.5 | 5.56 | .400 | .020 |
| X | B39017 [3] | 20:1 | 23 | 18.75 | none | .200 | .010 |
| XI | B39018 | 20:1 | 22 | 20.25 | 8.10 | .400 | .020 |
| XII | B39028 | 3:1 | 23 | 22.0 | 3.04 | .200 | .067 |

[1] Ammonium persulfate $5.26 \times 10^{-4}$ moles/liter.
[2] Triethanolamine $2.68 \times 10^{-4}$ moles/liter; ammonium persulfate $0.438 \times 10^{-4}$.
[3] Moles/liter low, diluted to 1000 ml and then concentrated back with Rinco evaporator to 500 ml for precipitation.
[4] Acrylamide monomer.
[5] Sodium vinyl sulfonate monomer.

In the displacement of petroleum, e.g., in secondary or tertiary petroleum recovery processes, the mobility control agents of the present invention are formulated with water to provide a mobility which is not substantially less than, and is preferably greater than, the fluids which they are to displace. The displaced fluids may be petroleum itself, petroleum and water (as in the case in tertiary recovery operations), or may be a slug of primary dispersing agent, e.g., micellar solution, hydrocarbon, or the lide. The displacing agents of the present invention may themselves be driven through the formation by the action of a drive fluid, e.g, water with or without conventional thickening agents. Other techniques, e.g., the "tapering" of viscosity by reducing the concentration of the mobility control agent over the period of the injection process can be employed with the mobility control agents of the present invention.

Modifications of the Invention

It should be understood that the invention is capable of a variety of modifications and variations which will be made apparent to those skilled in the art by a reading of the specification and which are to be included within the spirit of the claims appended hereto.

For example, in some applications the thickeners disclosed above may be used as mixtures with each other or with thickeners of distinctly different chemical structures such as polyethylene oxide, polyvinylpyrrolidones, and polyvinyl carboxylates. In some cases, the thickener may be incorporated into the surfactant slug itself.

Also, the concentrations of unhydrolyzed poly poly(acrylamides vinyl sulfonate) discussed under "Description of the Preferred Embodiments" should be understood to refer to concentration during the injection step. Where desired, the contact between formaldehyde and sulfite and poly(acrylamide-vinyl sulfonate) may be conducted at higher concentrations with subsequent dilution prior to or during injection.

What is claimed is:

1. In a process for the recovery of petroleum from formations by injecting aqueous solutions of viscosity-increasing compositions, the improvement comprising injecting into said formations to displace oil there from aqueous solutions containing a viscosity increasing amount of copolymers formed by copolymerizing acrylamide with a monomer selected from the group consisting of alkali metal vinyl sulfonates, wherein said copolymer contains from about 0.5 to about 50 mole percent of said alkali metal vinyl sulfonates and has a molecular weight in the range of from about 1 million to about 100 million.

2. The improvement of claim 1 wherein there are present in said aqueous solution from about 50 to about 5000 ppm by weight of said copolymer.

3. The improvement of claim 1 wherein said copolymer is additionally treated with from 0.01 to about 10.0 moles of formaldehyde per mole of said copolymer to produce a methlolated copolymer which is incorporated into said aqueous solution for injection.

4. A process according to claim 3 wherein said methylolated copolymer is additionally treated with from about 0.01 to about 2.0 moles of inorganic sulfite per mole of acrylamide monomer unit in said copolymer to produce a sulfomethylolated copolymer for incorporation into said aqueous solutions for injection, said inorganic sulfite being selected from the group consisting of alkali metal sulfites, alkaline earth metal sulfites, alkali metal bisulfites, alkaline earth metal bisulfites, ammonium sulfite, sulfite, ammonium bisulfite, and the corresponding pyrosulfites and metabisulfites 5. A process according to claim 1 wherein said copolymer has a molecular weight within the range of from about 500,000 to about 100,000,000.

6. The process of claim 1 wherein said polymerization is accomplished in the presence of the redox polymerization catalyst.

7. A process according to claim 6 wherein said polymerization catalyst is selected from the group consisting of peroxides, peracids, persulfates, and amines.

8. A process according to claim 7 wherein said catalyst comprises a tertiary amine-persulfate redox catalyst system.

9. A process according to claim 3 wherein the aqueous solution contains from about 50 to about 5000 parts per million by weight of said methylolated copolymer, said methylolated copolymer having a molecular weight in the range of from about 1 million to about 100 million, and wherein there are present from about 0.01 to about 10.0 moles of formaldehyde per mole of acrylamide monomer unit contained in said methylolated copolymer, and wherein the temperature is in the range of from about 0° to about 300°C. and the contact between said copolymer and said formaldehyde is maintained for a reaction time of from about 0.1 to about 100 hours.

10. A process according to claim 4 wherein the sulfite is selected from the group consisting of: alkali sulfites, alkaline earth sulfites, alkali bi-sulfites, alkaline earth bisulfites, ammonium sulfite, ammonium bisulfite, the pyrosulfites, and metabisulfites corresponding to any of the foregoing and mixtures of any of the foregoing, and wherein there are present from about 0.01 to about 2.0 moles of sulfite per mole of acrylamide monomer unit in the sulfomethylated copolymer, and wherein the temperature is in the range of from about 0° to about 300°C. and the contact is maintained for a reaction time of from about 0.1 to about 100 hours.

* * * * *

UNITED STATES PATENT OFFICE
CERTIFICATE OF CORRECTION

Patent No. 3,779,917              Dated Dec. 18, 1973

Inventor(s) Charles J. Norton; David O. Falk

It is certified that error appears in the above-identified patent and that said Letters Patent are hereby corrected as shown below:

| | |
|---|---|
| Column 1, line 55 | page 1234f should read --page 12343f-- |
| Column 4, line 21 | delete "or by" and insert --by-- |
| Column 4, line 57 | separate the words increasing agent |
| Column 5, line 24 | following sodium insert --sulfite-- |
| Column 7, line 10 | correct the spelling of like |
| Column 7, line 32 | delete "poly" |

Signed and Sealed this twenty-third Day of August 1977

[SEAL]

Attest:

RUTH C. MASON  
Attesting Officer

C. MARSHALL DANN  
Commissioner of Patents and Trademarks